United States Patent Office 3,314,838
Patented Apr. 18, 1967

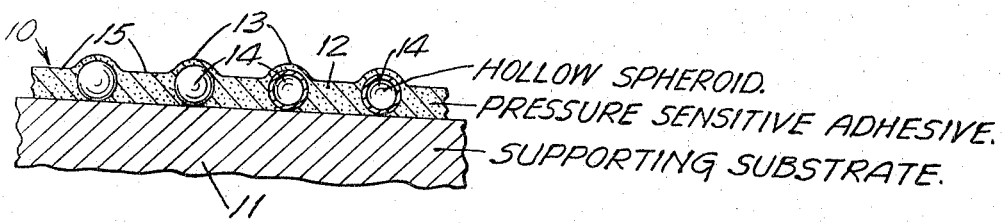

3,314,838
PRESSURE SENSITIVE ADHESIVES CONTAINING HOLLOW SPHEROIDAL PARTICLES
James V. Erwin, North St. Paul, Minn., assignor to Minnesota Mining and Manufacturing Company, St. Paul, Minn., a corporation of Delaware
Filed Aug. 26, 1964, Ser. No. 392,184
5 Claims. (Cl. 156—71)

This invention relates to adhesive compositions and to methods of making and using the same. More particularly, the invention relates to pressure-sensitive adhesives in coatable liquid form and which are capable of providing adhesive-coated surfaces of novel structure and having novel and useful properties and capabilities.

One typical and important application for which the adhesive compositions of the invention have been found particularly advantageous is in the bonding of large areas of flexible sheet material to flat supporting surfaces and in accurate alignment or position. The hanging of decorative patterned wall coverings or of printed signs or posters is a specific example. The composition is first applied to the wall or billboard surface and is permitted to dry. The printed sheet material is then supported against the coated surface, and slid into the exact location required. Bonding of the sheet to the surface is then accomplished merely by the application of pressure.

Pressure-sensitive adhesives and adhesive coated sheet materials are well known in the art as having the ability to adhere to adhesive-receptive surfaces on mere contact. Pressure-sensitive adhesive labels and tapes, for example, may be adhered to various surfaces under very light finger-pressure. While they can later be removed therefrom by stripping, they cannot be slid around on the surface because of their inherent quick-grab properties. It is all the more surprising, therefore, to find that sliding contact is possible between large areas of paper, cloth, plastic film and other flexible sheet materials, and wall or billboard surfaces or the like which have been coated with normally tacky and pressure-sensitive adhesive compositions.

It has now been found that the incorporation of small light-weight fragile thin-walled spheroidal particles in the liquid adhesive composition prior to coating is effective in producing a dried adhesive coating permitting sliding contact of adhesive-receptive sheet materials which are adherently bonded to the coating when pressed firmly in place.

Most if not all normally tacky and pressure-sensitive adhesive compositions are useful in the practice of the invention where areas of small or moderate dimensions are concerned. Adhesives of high internal strength and aggressive tackiness are preferred, particularly for use on larger areas. Adhesives based on partially cured or cross-linked rubber or rubbery polymers are generally high in internal or cohesive strength and are particularly desirable.

The adhesive composition may be applied from solution in volatile solvent, or from dispersion in volatile liquid vehicle, or in other ways. Aqueous dispersions are advantageous as permitting relatively high concentrations of non-volatile components while avoiding the expense, inconvenience and fire hazard associated with volatile organic solvents. Application may be by brush, paint roll, swab, spray or in other ways, the adhesive being spread as a thin uniform coating. Brush application is convenient, and for this purpose the aqueous dispersions are particularly effective.

The hollow spheroids may range in particle size from about 20 microns up to as large as about 500 microns. With the smaller particles the concentration required may be sufficient to produce a sharp decrease in the ability of the coating to form a strong adhesive bond. The larger particles are effective with heavier sheet materials but have resulted in some unevenness of surface where very thin and flexible coverings were adhered to smooth substrates. Spheroids within the range of about 50 to about 250 microns and which are adequately resistant to normal handling while still being easily shattered under moderate pressure are readily available and are presently preferred.

The hollow particles are easily crushed, as may be determined by manipulation beneath a low power microscope. Light pressure with the tip of a spatula against the spheroid supported on a rigid surface serves to shatter the individual particle into thin flakes; yet the particles when supported within the adhesive coating are amply strong and rigid for their intended purpose. Glass particles of the required properties are found to lie within a density range of about one-tenth to about one-half, or preferably from about one-fifth to about one-third, gram per cubic centimeter, as determined with an air comparison pycnometer. Hollow clay bubbles may alternatively be used, as also easily crushable hollow spheroids of rigid resinous materials, e.g. urea-formaldehyde and phenol-formaldehyde resins.

The proportionate amount of particles to be incorporated in the adhesive composition is influenced by the size and size distribution of the particles, the thickness of the coating, and perhaps by other factors. Thus with a given weight of a particular adhesive composition the addition of three parts by weight of hollow glass spheroids having a particle size distribution of about 50–75 microns produced a coating having slidability and adhesion properties substantially equivalent with those obtained on adding 1½ parts of spheroids at 105 to 125 microns, or ½ part at 150 to 175 microns. With coatings of increased thickness, only the larger size particles were effective. Since adhesives and particles of widely different composition are equally useful, proportions are most appropriately expressed in percent by volume based on the volume of the dry adhesive. It is found that volume loadings within the range of from about one to about 40 percent of particles, based on the total volume of dry adhesive and particles, are useful in providing coatings which possess both slidability and bondability. A preferred volume loading for glass particles of 125–150 micron diameter is between about three and about ten percent.

For convenience in formulating, the proportions are more frequently expressed in weight percent.

The compositions are desirably prepared by stirring the spheroids into the previously prepared liquid adhesive composition, taking care to avoid crushing the fragile particles. Various suspending agents may be added so that the spheroids will remain uniformly dispersed in the solution or dispersion during shipment, storage and application. After the liquid mixture is applied to a wall or other substrate, e.g. by brushing, the spheroids show a tendency to appear at the exposed surface, as a more or less uniform pattern of all but invisible rounded elevations. The adhesive shrinks during drying but remains as a very thin film over the exposed tips or outwardly extending portions of the spheroids. Surprisingly, the film is so thin that sheet materials placed in contact with the exposed tips do not become adherently attached thereto but are easily slid about over the pebbled surface. Slidable positioning of the sheet may be accomplished by hand manipulation, with paperhangers' brushes, or otherwise.

Once the sheet is in its final position, it is readily bonded in place by application of additional pressure sufficient to break the spheroids and to force the surface of the sheet into full contact with the adhesive mass. Hand pressure applied through a narrow squeegee or paperhangers' roller is adequate. Thereafter the sheet may no longer be moved about on the substrate. With suitable adhesives the bond obtained is of such strength that removal by stripping of large areas without tearing or otherwise mutilating the sheet material soon becomes practically impossible.

Breaking the spheroids during pressure bonding results in a substantially uniform adhesive film thickness and in smooth application of the sheet material. The residual fragments of the spheroid shells remain embedded in the adhesive. Air is forced from between the two surfaces through paths between the points of elevation during the pressure bonding step. As a result the sheet material is in smooth adherent contact with the entire surface of the adhesive layer, and maximum bonding is achieved.

Peculiarly, the presence of a pebbled adhesive surface does not guarantee the slidability of sheet materials thereover. Adhesive coatings formed with uniformly distributed ridges or protrusions of the normally tacky and pressure-sensitive adhesive are found to adhere strongly to paper or other sheet materials when attempts are made to slide the sheet material over the adhesive surface. The presence of an essentially rigid core within the adhesive tip or elevation appears to be essential to the desired slidability feature.

Hollow beads or spheroids useful in the compositions of this invention may be either organic or inorganic, providing the size and strength of the structure is and remains as previously defined. Glass spheroids are preferred, but spheroids having thin shells formed from clay compositions, urea- or phenol-formaldehyde resins, alkali metal silicates and many other materials are also useful. Methods for the preparation of such products have been published: see in particular Veatch et al. U.S. Patents Nos. 2,797,201, 2,978,339, 2,978,340 and 3,030,215, wherein the preparation of "microballoons" is described. The spheroids have been suggested, inter alia, as low density fillers for incorporation in self-curing resinous compositions, for example see British Patents 957,037 and 957,484 published in 1964. However no one prior to the present invention has suggested the incorporation of "microballoons" or other hollow rigid crushable microspheres or spheroids in pressure-sensitive adhesive compositions in the manner and for the purposes here described, as far as I am aware.

The following specific examples will serve further to illustrate but not to limit the practice of the invention.

*Example 1*

A pressure-sensitive adhesive consisting essentially of 100 parts by weight of a copolymer of equal parts of vinyl acetate and dibutyl maleate, and 10 parts of dibutyl phthalate, is obtained in the form of an aqueous dispersion containing 53.9 percent of non-volatile adhesive material in 46.1 percent of volatile vehicle as determined by drying a sample to constant weight at 105° C. To 100 parts of the dispersion there is added one part of hollow glass spheroids having a density of 0.19 gram/cc. and a particle size range of about 105 to 177 microns. The particles are carefully and uniformly mixed into the adhesive composition by hand stirring. The volume loading is approximately 10 percent.

The mixture is uniformly brushed over the paper surface of gypsum wallboard and dried in a current of air. The dry coating has a slightly rough "goose-flesh" surface and feels tacky to the fingertips.

A section of good quality wallpaper is held against the coated surface and is caused to slide to and fro by gentle hand manipulation. The paper bonds sufficiently to avoid immediate falling when support is removed, but is easily slid about on the coated surface under the forces applied.

Once in place, the paper is pressed firmly against the coated surface, using a low friction polyethylene wedge as a squeegee and with hand application. Subsequent attempts to move or readjust the position of the paper cause tearing and delaminating of either the wallpaper or the wallboard surface.

Similarly effective slidability and bonding ability are obtained with the same adhesive composition but using ⅓ percent by weight of glass spheroids of 175–250 micron size and .241 g./cc. density in place of the smaller spheroids of Example 1.

*Example 2*

Small glass spheroids in an amount of five parts by weight are mixed with 95 parts of a water emulsion adhesive containing 55 percent of pressure-sensitive adhesive material. The spheroids have a density of 0.33 g./cc. and a size range of about 75–125 microns. The adhesive is an acrylic polymer pressure-sensitive adhesive available in the form of an aqueous dispersion weighing 9.65 lbs./gallon as "Daratak 74L" adhesive, obtained from W. R. Grace Company. The volume loading is about 25 percent.

The mixture is painted on gypsum wallboard at a rate of approximately 12–13 cc./sq. ft. and is permitted to dry in the open air for one-half hour. Sections of printed paper and of cloth base vinyl film wallcoverings are each lightly held against the dry adhesive surface and slid into a desired position, and are then firmly adherently bonded in place by means of hand pressure applied through a narrow low-friction polyethylene squeegee. The paper is permanently bonded in place. The coated fabric as first applied is removable by stripping, but after remaining in place for 24 hours it can no longer be stripped from the panel without delaminating the wallboard substrate.

As a control, the same adhesive but without the addition of the spheroids is applied to wallboard in the same manner, and sections of wallcoverings are lightly held thereagainst. The adhesive coating adheres to the wallcoverings so firmly as to prevent any re-positioning by sliding.

The same adhesive is tested for relative bonding ability with and without the addition of small proportions of glass spheroids having a density of 0.289 gram/cc. and a size range of 100 to 125 microns. The samples are spread on metal panels and dried. Strips of vinyl coated fabric are forced against the coated surfaces, using a squeegee to provide localized pressure. The relative force required to remove the fabric by slow stripping (i.e. at 12 inches/min.) is then measured. Surprisingly, the presence of small loadings of the spheroids increases the adhesive bond, as shown by the following tabulation.

| Wt. Percent of Spheroids | Volume Loading | Stripping Force, lbs./in. |
| --- | --- | --- |
| 0 | 0 | 2.1–2.8 |
| ½ | 7 | 2.7–3.0 |
| 1 | 13 | 3.6–4.8 |
| 2 | 28 | 2.0–2.2 |
| 5 | | |

*Example 3*

In this example, irregularly shaped rounded hollow particles or spheroids prepared from Kanamite clay replace the glass "microballoons" of the previous examples. The spheroids, obtained from Ferro Chemical Corporation, constitute a portion having a measured density of 1.36 g./cc. and a size range, by screen analysis, of about 300–500 microns. The spheroids are added to the acrylic polymer adhesive dispersion of Example 2 and in the amount of two percent of the weight of the dispersion. The mixture is coated on a wall surface and permitted to dry. Wallpaper is slid into position and bonded under pressure to provide a covered surface in which the pattern of the spheroids is still detectable. With heavier coverings such as cloth backed vinyl film the slidability is equally good and the initial location of the spheroids is completely masked.

Example 4

A mixture, of five parts by weight of hollow glass "microballoon" spheroids having a particle size range of 75–125 microns and a density of 0.33 g./cc. in 100 parts of a 50% non-volatile content aqueous dispersion of a high internal strength self-bonding adhesive containing neoprene rubber and compatible heat-advancing phenol-aldehyde resin, is brush coated uniformly over a heavy plywood panel and over a corresponding thin formica panel. The adhesive in thin coatings remains tacky and pressure-sensitive for several hours after evaporation of aqueous vehicle, eventually curing to a non-tacky and very tough state. After preliminary drying, the formica panel is laid with its coated surface in contact with the coated surface of the plywood. It is then lifted off and replaced in slightly different location. The procedure is repeated a number of times until exact congruency of the two panels is attained. The upper panel is then pressed firmly against the lower, using heavy hand pressure applied locally with a small (two inch) rubber roller. Strong permanent bonding is achieved between the two panels.

In the absence of the spheroids, the coated panels adhere on the slightest contact, with such tenacity as to make any subsequent separation and re-location impossible.

Example 5

An adhesive composition is prepared by mixing together 100 parts by weight of an aqueous dispersion of pressure-sensitive adhesive, 10 parts of thickener solution, and 2.2 parts of urea-formaldehyde resin spheroids. The composition is brushed out on wallboard and permitted to dry. Wallpaper is slid over the coated surface into desired position and is then adherently affixed by application of pressure using a wooden roller.

The adhesive is a vinyl acetate copolymer type pressure-sensitive adhesive obtained as a 55–57% aqueous dispersion under the designation "Flex-bond" No. 150 from Air Reduction Chemical and Carbide Co. A dry film of the unmodified adhesive is clear and transparent, and has a nominal density of 1.046 grams/cc. Papers adhere to such films on contact.

Thickening of the adhesive dispersion to provide improved spreadability and for holding the spheroids in suspension is accomplished by the addition of "Acrysol ASE 60" alkali-soluble acrylic polymer, a commercial thickener obtained in the form of a 28% suspension in water. To 16.8 parts of the suspension there is first added 81.9 parts of water and 1.3 parts of strong ammonium hydroxide to form the thickener solution. The density of the dry thickener is 1.193 g./cc.

The resinous spheroids or microcapsules have a nominal screen size of 55 to 105 microns but are accompanied by a moderately large proportion of small solid resin particles or dusts much of which clings to the spheroid shells. The density of the product is 0.570 g./cc. as measured on the air comparison pycnometer, and the volume loading is accordingly calculated as about 6.7 percent. The spheroids are not as brittle as those of glass or clay and tend to collapse or flatten, rather than shatter, when subjected to light spatula pressure. However they impart fully adequate rigidity to prevent collapse of the pebbled surface and adhesive bonding to the paper during light sliding contact and prior to application of pressure as described.

Another adhesive which has given good results in the procedures herein described is a copolymer of acrylic acid and acrylate ester, applied from solution in a volatile organic solvent such as ethyl acetate. Such adhesives and adhesive solutions have been described in U.S. reissue patent No. Re. 24,906. Pressure-sensitive adhesives in the form of aqueous solutions, e.g. as described in U.S. Patent No. 2,838,421, are also useful in the practice of this invention.

The accompanying drawing schematically illustrates the invention in terms of a dried coating 10 of the adhesive mixture on the surface of a wall or other substrate 11. The pressure-sensitive adhesive 12 forms a thin surface layer 13 over the hollow spheroids 14, two of which are shown in cross-section. The adhesive surface 15 between the spheroids is essentially planar.

What is claimed is as follows:

1. An adhesive composition adapted for depositing pressure-sensitive adhesive coatings capable of slidably supporting flexible adhesive-receptive sheet materials laid thereagainst, said composition being a spreadable liquid comprising a pressure-sensitive adhesive, a volatile liquid vehicle for said adhesive in an amount sufficient to impart spreadability, and a quantity of small rigid light-weight fragile thin-walled hollow spheroidal particles having a particle size within the range of about 20 to about 500 microns and in an amount of from about one to about 40 percent by volume of the total volume of said spheroids and said adhesive.

2. An adhesive composition adapted for depositing pressure-sensitive adhesive coatings capable of slidably supporting flexible adhesive-receptive sheet materials laid thereagainst, said composition being a spreadable liquid comprising a pressure-sensitive adhesive, a volatile liquid vehicle for said adhesive in an amount sufficient to impart spreadability, and a quantity of small rigid light-weight fragile thin-walled hollow spheroidal glass particles having a particle size within the range of about 50 to about 250 microns and in an amount of from about three to about ten percent by volume of the total volume of said spheroids and said adhesive.

3. The method of adhering flexible adhesive-receptive sheet material to the surface of a rigid substrate, comprising applying to said surface a thin uniform coating of an adhesive composition as defined in claim 1, drying said coating by evaporation of said volatile liquid vehicle, placing said sheet material over the dried coating under low contact pressure permitting sliding contact therebetween, and then pressing said sheet material against said coating with a force sufficient to cause crushing of the spheroidal particles.

4. The process of preparing an adhesive composition useful in depositing on the surface of a rigid substrate a pressure-sensitive adhesive coating capable of slidably supporting flexible adhesive-receptive sheet materials laid thereagainst, comprising the steps of adding to a spreadable liquid consisting of a pressure-sensitive adhesive in a volatile liquid vehicle a quantity of small rigid light-weight fragile thin-walled hollow spheroidal particles sufficient to provide a volume loading of from about one to about 40 percent based on the total solids, and uniformly dispersing said particles throughout said spreadable liquid, said particles having a particle size within the range of about 20 to about 500 microns.

5. A substrate having a surface coated with a thin layer of pressure-sensitive adhesive containing from about one to about forty percent by volume of small rigid light-weight fragile thin-walled hollow spheroidal particles completely encased within said adhesive and forming a pattern of protuberances above the surrounding planar adhesive surface.

References Cited by the Examiner

UNITED STATES PATENTS

| | | |
|---|---|---|
| 3,027,271 | 3/1962 | Plasse et al. |
| 3,046,172 | 7/1962 | Reid. |
| 3,143,436 | 8/1964 | Dosmann. |
| 3,247,158 | 4/1966 | Alford et al. |

MORRIS LIEBMAN, *Primary Examiner.*

L. T. JACOBS, *Assistant Examiner.*